United States Patent
Mishra et al.

(10) Patent No.: US 10,671,495 B2
(45) Date of Patent: Jun. 2, 2020

(54) DISASTER RECOVERY REHEARSAL OF A WORKLOAD

(71) Applicant: Hewlett Packard Enterprise Development LP, Houston, TX (US)

(72) Inventors: Ravi Mishra, Bangalore (IN); Prabhanjan Gururaj, Bangalore (IN); Bhakthavatsala K. Naidu, Bangalore (IN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 206 days.

(21) Appl. No.: 15/881,956

(22) Filed: Jan. 29, 2018

(65) Prior Publication Data
US 2019/0235970 A1 Aug. 1, 2019

(51) Int. Cl.
*G06F 11/00* (2006.01)
*G06F 11/14* (2006.01)
*G06F 3/06* (2006.01)

(52) U.S. Cl.
CPC ......... *G06F 11/1469* (2013.01); *G06F 3/065* (2013.01); *G06F 3/067* (2013.01); *G06F 3/0619* (2013.01); *G06F 3/0665* (2013.01); *G06F 11/1451* (2013.01); *G06F 11/1464* (2013.01); *G06F 2201/805* (2013.01); *G06F 2201/82* (2013.01)

(58) Field of Classification Search
CPC ............ G06F 11/0748; G06F 11/2294; G06F 11/3024; G06F 11/00; G06F 11/07; G06F 11/1402
USPC .......................................................... 714/19
See application file for complete search history.

(56) References Cited

U.S. PATENT DOCUMENTS

| 6,732,294 B2 | 5/2004 | Mackrory |
| 7,770,058 B2 | 8/2010 | Phan |
| 8,037,361 B2 | 10/2011 | Bish et al. |

(Continued)

FOREIGN PATENT DOCUMENTS

EP 3111326 A2 1/2017

OTHER PUBLICATIONS

NETIQ, "Platespin Migrate," (Research Paper), 2014, 2 Pgs.

*Primary Examiner* — Sarai E Butler
(74) *Attorney, Agent, or Firm* — Hewlett Packard Enterprise Patent Department

(57) ABSTRACT

Examples disclosed herein relate performing a disaster recovery rehearsal of a workload in a three-datacenter topology. A workload may be selected on a computing system at a first datacenter location of a three-datacenter topology, for performing a disaster recovery rehearsal. The three-datacenter topology may comprise a first datacenter location, a second datacenter location and a third datacenter location. At least one of second datacenter location or third datacenter location may be selected for performing the disaster recovery rehearsal. A configuration of the workload may be cloned to generate a cloned workload. A resource may be identified in a selected datacenter location for performing the disaster recovery rehearsal. The cloned workload may be applied to the resource in the selected datacenter location, and a result of running the cloned workload on the resource may be generated. The computing system may receive the result from the selected datacenter location.

20 Claims, 4 Drawing Sheets

(56) References Cited

U.S. PATENT DOCUMENTS

| | | | |
|---|---|---|---|
| 8,171,111 B1 | 5/2012 | Niedzielski et al. | |
| 8,359,491 B1 | 1/2013 | Bloomstein | |
| 9,092,395 B2 | 7/2015 | Bradfield et al. | |
| 9,569,314 B2 | 2/2017 | Iwasaki et al. | |
| 9,659,267 B2 | 5/2017 | Li et al. | |
| 10,146,636 B1* | 12/2018 | Ghare | G06F 11/3688 |
| 2008/0077366 A1 | 3/2008 | Neuse et al. | |
| 2009/0292953 A1* | 11/2009 | Barghouthi | G06F 11/1443 714/40 |
| 2010/0325273 A1 | 12/2010 | Kudo | |
| 2012/0185913 A1* | 7/2012 | Martinez | G06F 9/455 726/1 |
| 2013/0238938 A1* | 9/2013 | Baliga | G06F 11/3632 714/38.1 |
| 2014/0156323 A1* | 6/2014 | Prieto | G06Q 10/0633 705/7.12 |
| 2014/0215255 A1* | 7/2014 | Zaheer | G06F 11/004 714/1 |
| 2015/0363282 A1* | 12/2015 | Rangasamy | G06F 11/1451 714/4.12 |
| 2016/0188689 A1 | 6/2016 | Singh | |
| 2016/0196186 A1* | 7/2016 | Yang | G06F 11/1451 711/162 |
| 2016/0378625 A1* | 12/2016 | Aizer | G06F 11/2069 714/6.3 |
| 2017/0083415 A1* | 3/2017 | Reza | G06F 11/1425 |
| 2017/0149700 A1* | 5/2017 | Liu | H04L 51/04 |
| 2017/0153919 A1* | 6/2017 | Jones-McFadden | G06Q 10/0631 |
| 2018/0199239 A1* | 7/2018 | Sabater Maroto | G06F 9/5072 |

* cited by examiner

DISASTER RECOVERY REHEARSAL OF A WORKLOAD

BACKGROUND

A datacenter may centralize and consolidate Information Technology (IT) resources thereby enabling organizations to conduct business round-the-clock. A datacenter infrastructure may include a collection of heterogeneous resources (for example, servers, storage devices, network components, etc.).

BRIEF DESCRIPTION OF THE DRAWINGS

For a better understanding of the solution, examples will now be described, with reference to the accompanying drawings, in which.

DETAILED DESCRIPTION

Figure 1:
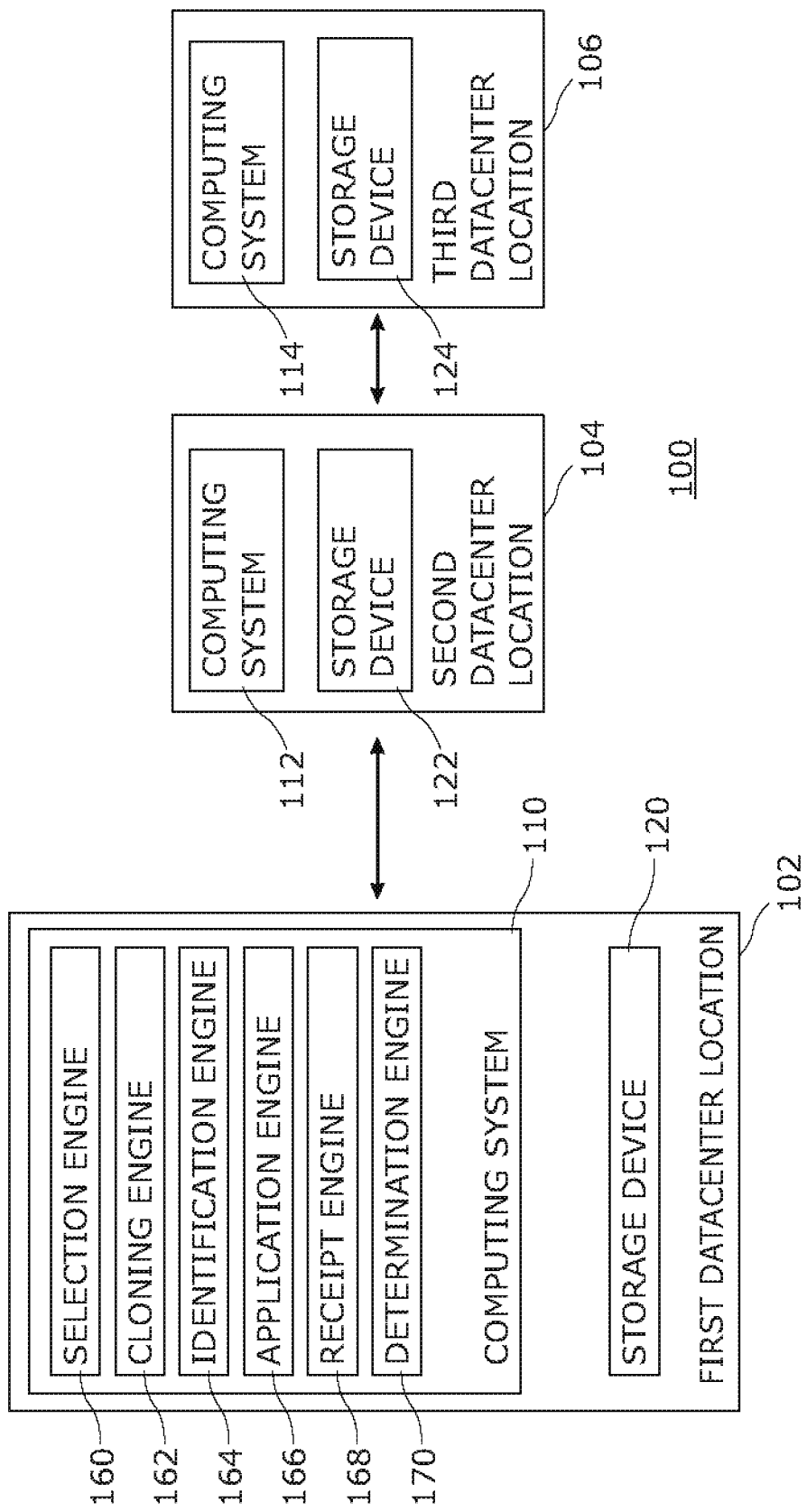
FIG. 1 is a block diagram of an example computing environment for performing a disaster recovery rehearsal of a workload in at least a three-datacenter topology.

A typical datacenter infrastructure may include a variety of components (hardware and/or software). These components may include, for example, servers, networking equipment (for example, routers and switches), storage, and security (for example, firewall). A datacenter may be used to store data for an organization. Enterprises may prefer to store a replication of their primary data in multiple datacenters. For example, data stored in a first datacenter may be replicated to a second datacenter, which may be located in a location relatively far from the first datacenter. In the event of a disaster (for example, natural, economic, political, etc.) affecting the first datacenter, the data stored in the second datacenter may be used to maintain operations of an enterprise.

However, the demand for a third datacenter is growing among the enterprises as failure tolerance which comes with two datacenters may not be sufficient. In business critical environments, any failure of workload recovery due to divergence in workload configurations across datacenters, data inconsistency or for any other reason may be detrimental to a business, and unplanned downtime may have far reaching business impacts. It may be, thus, desirable to validate the preparedness of a second or third datacenter location to host production workloads by performing a rehearsal of production workload operations on these datacenters without interruption to the primary instance of a workload running at the first datacenter location. It may be more challenging to rehearse in a third datacenter location, which may or may not have dedicated computing resources available to host production workloads.

To address these technical challenges, the present disclosure describes various examples for performing a disaster recovery rehearsal of a workload in at least a three-datacenter topology. In an example, a workload may be selected on a computing system at a first datacenter location of a three-datacenter topology, for performing a disaster recovery rehearsal. The three-datacenter topology may comprise a first datacenter location, a second datacenter location and a third datacenter location. Further, at least one of the second datacenter location or the third datacenter location may be selected for performing the disaster recovery rehearsal of the workload. A configuration of the workload may be cloned to generate a cloned workload. Next, a resource may be identified in a selected datacenter location for performing the disaster recovery rehearsal of the workload. The selected datacenter location may comprise at least one of the second datacenter location or the third datacenter location. The cloned workload may be applied to the resource in the selected datacenter location, and a result of running the cloned workload on the resource may be generated. The computing system at the first datacenter location may receive the result of the disaster recovery rehearsal of the workload from the selected datacenter location. Based on the result, a suitability of the selected datacenter location for performing a disaster recovery of the workload may be determined.

Examples described herein may help validate the preparedness of at least a second or third datacenter location to host production workloads by performing a rehearsal of production workload operations on these datacenters without interruption to the primary instance of a workload running at the first datacenter location.

FIG. 1 is a block diagram of an example computing environment 100 for performing a disaster recovery rehearsal of a workload. In an example, computing environment 100 may represent a three-datacenter topology comprising a first datacenter location 102, a second datacenter location 104, and a third datacenter location 106. For simplicity, only three datacenters are shown in FIG. 1. However, other examples of this disclosure may include more than three datacenters, and it is contemplated that examples described herein may be performed in a topology that includes more than three datacenters.

In an example, the first datacenter, the second datacenter, and the third datacenter may each include a computing system 110, 112, and 114, and a storage device 120, 122, and 124, respectively. Although only one computing system and one storage device are shown in FIG. 1 for each of the first datacenter location 102, the second datacenter location 104, and the third datacenter location 106, other examples of this disclosure may include more than one computing system and more than one storage device in any of the first datacenter location 102, the second datacenter location 104, and the third datacenter location 106.

Computing devices 110, 112, and 114 may be communicatively coupled to storage devices 120, 122, and 124. Some example communication protocols that may be used by computing devices 110, 112, and 114 to communicate with storage devices 120, 122, and 124 may include Fibre Channel (FC), Ethernet, Internet Small Computer System Interface (iSCSI), HyperSCSI, ATA over Ethernet (AoE), and Fibre Channel over Ethernet (FCoE).

Computing systems 110, 112, and 114 may each represent any type of computing device capable of executing machine-executable instructions. Examples of the computing device may include, for example, a server, a desktop computer, a notebook computer, a tablet computer, a thin client, and the like.

Storage devices 120, 122, and 124 may each include a non-transitory machine-readable storage medium that may store, for example, machine executable instructions, data, and/or metadata. Some non-limiting examples of a non-transitory machine-readable storage medium may include a hard disk, a storage disc (for example, a CD-ROM, a DVD, etc.), a disk array, a storage tape, a solid state drive, a Serial Advanced Technology Attachment (SATA) disk drive, a Fibre Channel (FC) disk drive, a Serial Attached SCSI (SAS) disk drive, a magnetic tape drive, and the like. In other examples, storage devices 120, 122, and 124 may each include a Direct Attached Storage (DAS) device, a Redundant Array of Inexpensive Disks (RAID), a data archival storage system, or a block-based device over a storage area network (SAN). In one example, storage devices 120, 122, and 124 may each include a storage array, which may include one or more storage drives (for example, hard disk drives, solid state drives, etc.).

First datacenter location 102, second datacenter location 104, and third datacenter location 106 may be communicatively coupled, for example, via a computer network. The computer network may be a wireless or wired network. The computer network may include, for example, a Local Area Network (LAN), a Wireless Local Area Network (WAN), a Metropolitan Area Network (MAN), a Storage Area Network (SAN), a Campus Area Network (CAN), or the like. Further, the computer network may be a public network (for example, the Internet) or a private network (for example, an intranet).

In an example, first datacenter location 102 may store data on a storage device (for example, storage device 120). In an example, the data may represent primary storage of data for an enterprise. Examples of the data may include, application data, a database, etc. In an example, the data stored on first datacenter location 102 may be replicated to second datacenter location 104 via synchronous or asynchronous replication. In an example, the data stored on first datacenter location 102 may be replicated to third datacenter location 106 via synchronous or asynchronous replication.

In an example, at least one of first datacenter location 102, second datacenter location 104, and third datacenter location 106 may include a cloud system. The cloud system may be a private cloud, a public cloud, or a hybrid cloud. The cloud system may be used to provide or deploy various types of cloud services. These may include Infrastructure as a Service (IaaS), Platform as a Service (Paas), Software as a Service (SaaS), and so forth.

In an example, the first datacenter location 102 is in a same region (for example, building, city, state, etc.) as the second datacenter location 104. In an example, the first datacenter location 102 and the second datacenter location 104 are in a first region, and the third datacenter location 106 is in a second region.

In an example, first datacenter location 102 may run a workload or a plurality of workloads. The term "workload", as used herein, may refer to any machine-readable instructions executing on a computing system (for example, computing system 110). A "workload" may include, for example, a computer application, an operating system, a process, and an instruction. In an example, third datacenter location 106 may run a non-critical workload(s). As used herein, a non-critical workload may include a workload that is not critical for a business. Examples of non-critical workloads may include development and test applications.

In an example, computing system 110 may include a selection engine 160, a cloning engine 162, an identification engine 164, an application engine, 166, a receipt engine 168, a determination engine 170.

Engines 160, 162, 164, 166, 168, and 170 may include any combination of hardware and programming to implement the functionalities of the engines described herein. In examples described herein, such combinations of hardware and software may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one engine of computing system 110. In some examples, the at least one machine-readable storage medium may store instructions that, when executed by the at least one processing resource, at least partially implement some or all engines of the device 110. In such examples, computing system 110 may include the at least one machine-readable storage medium storing the instructions and the at least one processing resource to execute the instructions.

Selection engine 160 may be used to select a workload running in a computing system (for example, computing system 110) of first datacenter location 102 for performing a disaster recovery rehearsal. As used herein, the term "disaster recovery rehearsal" may refer to a procedure(s) performed in order to identify gaps or rehearse actions in the event of a disaster (for example, natural, economic, political, etc.). In an example, selection engine 160 may be used to select each workload of computing system of first datacenter location 102 for performing a disaster recovery rehearsal. In another example, selection engine 160 may be used to select each workload of first datacenter location 102 for performing a disaster recovery rehearsal.

Upon selection of a workload of first datacenter location 102 for performing a disaster recovery rehearsal, selection engine 160 may be used to select a separate datacenter location for performing the disaster recovery rehearsal of the workload. In an example, the separate datacenter location may include one of the second datacenter location 104, the third datacenter location 106, or both.

In response to selection of a separate datacenter location for performing the disaster recovery rehearsal of the workload, cloning engine 162 may be used to clone the workload. In an example, cloning the workload may comprise cloning a configuration of the workload. Cloning the configuration of the workload may include cloning a parameter related to the workload. Examples of the parameter may include a host name, an IP address related to the workload, a subnet, a storage LUN, a volume, a file system type, and a file system mount point. In an example, cloning of the workload may generate a cloned workload.

In response to generation of the cloned workload, identification engine 164 may identify a resource in the selected datacenter location for performing a disaster recovery rehearsal of the workload. The resource may include a compute resource, a storage resource, a network resource and/or an application resource. For example, resources that perform processing or related functions may be termed as "compute" resource, resources that perform network related or ancillary functions may be termed as "network" resource, resources that perform storage or related functions may be termed as "storage" resource, and resources that provide application services or related processes may be termed as "application" resource. In an example, a server may be selected in the selected datacenter location for performing a disaster recovery rehearsal of the workload.

In an example, identifying a resource in the selected datacenter location for performing a disaster recovery rehearsal of the workload may comprise identifying, by identification engine 164, each of the computing systems in the selected datacenter location where the workload is enabled to run. Identification engine 164 may further determine whether the workload has a dependency on other resources (for example, a network resource, a storage resource, and/or an application resource). If the workload has a dependency on other resources, identification engine 164 may identify those enabled computing systems that have access to those resources. Identification engine 164 may further identify whether those resources have capacities to host the workload. With this information, identification engine 164 may generate a workload placement list that identifies a potential computing system in the selected datacenter which may be used for performing a disaster recovery rehearsal of the workload. In an example, the potential computing system in the list may be sorted, in an order of priority, based on the abovementioned factors. In case multiple potential computing systems are identified, identification engine 164 may select the first computing system in the list as the resource for performing the disaster recovery rehearsal in the selected datacenter.

Application engine 166 may apply the cloned workload to the resource in the selected datacenter location. In an example, applying the cloned workload to the resource in the selected datacenter location may comprise applying a configuration of the workload to the resource in the selected datacenter location. In an example, applying the cloned workload to the resource in the selected datacenter location may comprise generating a copy of replicated data in the second datacenter location 104, and exposing the copy of replicated data to the resource. The replicated date in the second datacenter, which was originally available to the resource, is masked. Due to masking, the replicated data in the second datacenter is made inaccessible to the resource where a disaster recovery rehearsal of the workload is to be performed. In an example, applying the cloned workload to the resource in the selected datacenter location may comprise disabling non-critical workload in the selected datacenter.

Once the cloned workload is applied to the resource in the selected datacenter location, a disaster recovery rehearsal of the workload may be performed on the resource. Performing the disaster recovery rehearsal of the workload may comprise, for example, performing data replication checks, verifying failover configurations, validating IP addresses provided for the rehearsal workload and checking them for compatibility with the selected datacenter subnet, running the workload on the resource, performing input/output (I/O) operations on the copy of replicated data without causing any disruption to the primary logical unit numbers (LUNs), and determining and/or recording the run time state transition of rehearsal workloads.

In an example, performing the disaster recovery rehearsal of the workload may comprise validating compute, storage, network, and application resources in the selected datacenter location for the workload. Examples of validating the compute resources may include determining processing capacity, available memory, disk space, configured weights of systems, and permitted resource capacities of workloads. Examples of validating the storage resources may include validating a replication status, availability & health of arrays, data consistency, and Fibre Channel (FC) bandwidth. Examples of validating the network resources may include validating a configuration of floating IPs, I/O bandwidth, and network connectivity. Examples of validating the application resources may include validating dependency software availability and configuration consistency.

In an example, performing the disaster recovery rehearsal of the workload may comprise determining a recovery time of the workload. As used herein, the "recovery time" may include the time taken by the resource to apply and bring up the cloned workload. The recovery time of the rehearsal workload may be recorded.

In an example, the result(s) of disaster recovery rehearsal may be captured, for example, in a report. The result (for example, a report) may be provided by the selected datacenter, where the disaster recovery rehearsal was performed, to the computing system at the first datacenter location 102. Receipt engine 168 may receive the result of the disaster recovery rehearsal of the workload from the selected datacenter location.

In response to receiving the result of disaster recovery rehearsal, determination engine 170 may determine a suitability of the selected datacenter location for performing a disaster recovery of the workload, for example, during a disaster.

In other examples, second datacenter location 104 or third datacenter location 106 may run a workload(s) on a respective computing system (for example, 112 and 114). In such case, selection engine 160, cloning engine 162, identification engine 164, application engine, 166, receipt engine 168, and determination engine 170 may be present on the respective computing system (for example, 112 and 114) of second datacenter location 104 or third datacenter location 106, and simultaneously perform functionalities described herein in relation thereto.

Figure 2:
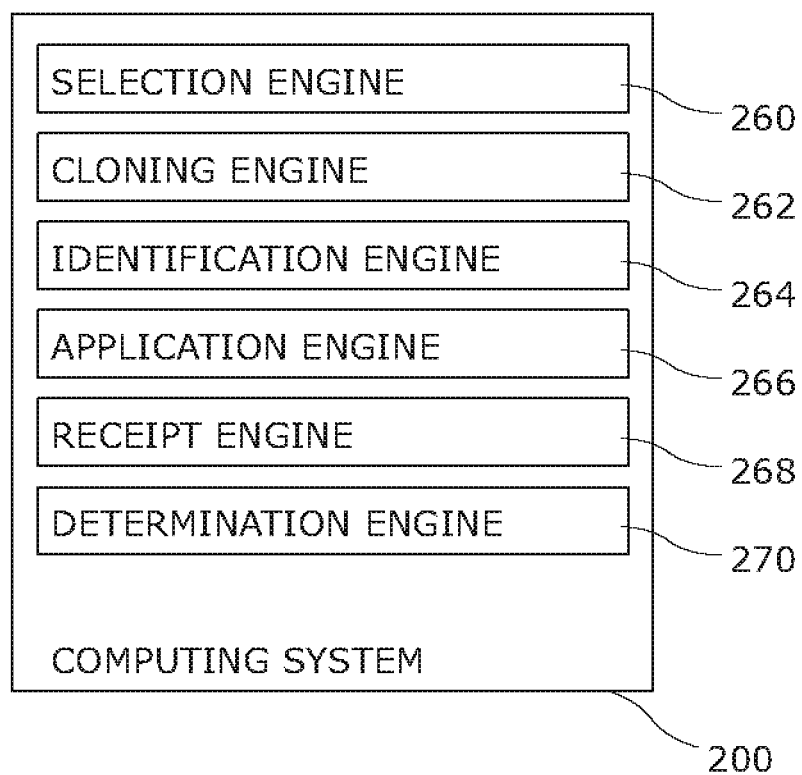
FIG. 2 is a block diagram of an example system for performing a disaster recovery rehearsal of a workload in at least a three-datacenter topology.

FIG. 2 is a block diagram of an example system 200 for performing a disaster recovery rehearsal of a workload in at least a three-datacenter topology. In an example, system 200 may be analogous to computing device 110, 112, or 114 of FIG. 1, in which like reference numerals correspond to the same or similar, though perhaps not identical, components. For the sake of brevity, components or reference numerals of FIG. 2 having a same or similarly described function in FIG. 1 are not being described in connection with FIG. 2. Said components or reference numerals may be considered alike.

Computing system 200 may each represent any type of computing device capable of executing machine-executable instructions. Examples of the computing device may include, for example, a server, a desktop computer, a notebook computer, a tablet computer, a thin client, and the like.

In an example, computing system 200 may include a selection engine 260, a cloning engine 262, an identification engine 264, an application engine, 266, a receipt engine 268, a determination engine 270. In an example, the aforementioned engines may perform functionalities similar to those described earlier in reference to selection engine 160, cloning engine 162, identification engine 164, application engine 166, receipt engine 168, and determination engine 170 of FIG. 1, respectively.

In an example, selection engine 260 may select a workload for performing a disaster recovery rehearsal. Selection engine 260 may select at least one of the second datacenter location or the third datacenter location for performing the disaster recovery rehearsal of the workload. Cloning engine 262 may clone a configuration of the workload to generate a cloned workload. Identification engine 264 may identify a resource in a selected datacenter location. The resource in the selected datacenter location may be useable to perform the disaster recovery rehearsal of the workload. The selected datacenter location may comprise at least one of the second datacenter location or the third datacenter location. Application engine 266 may apply the cloned workload to the resource in the selected datacenter location. Receipt engine 268 may receive a result of the disaster recovery rehearsal of the workload from the selected datacenter location. The result may be generated by running the cloned workload on the resource of the selected datacenter location. Determination engine 270 may determine a suitability of the selected datacenter location for performing a disaster recovery of the workload, based on the result.

Figure 3:
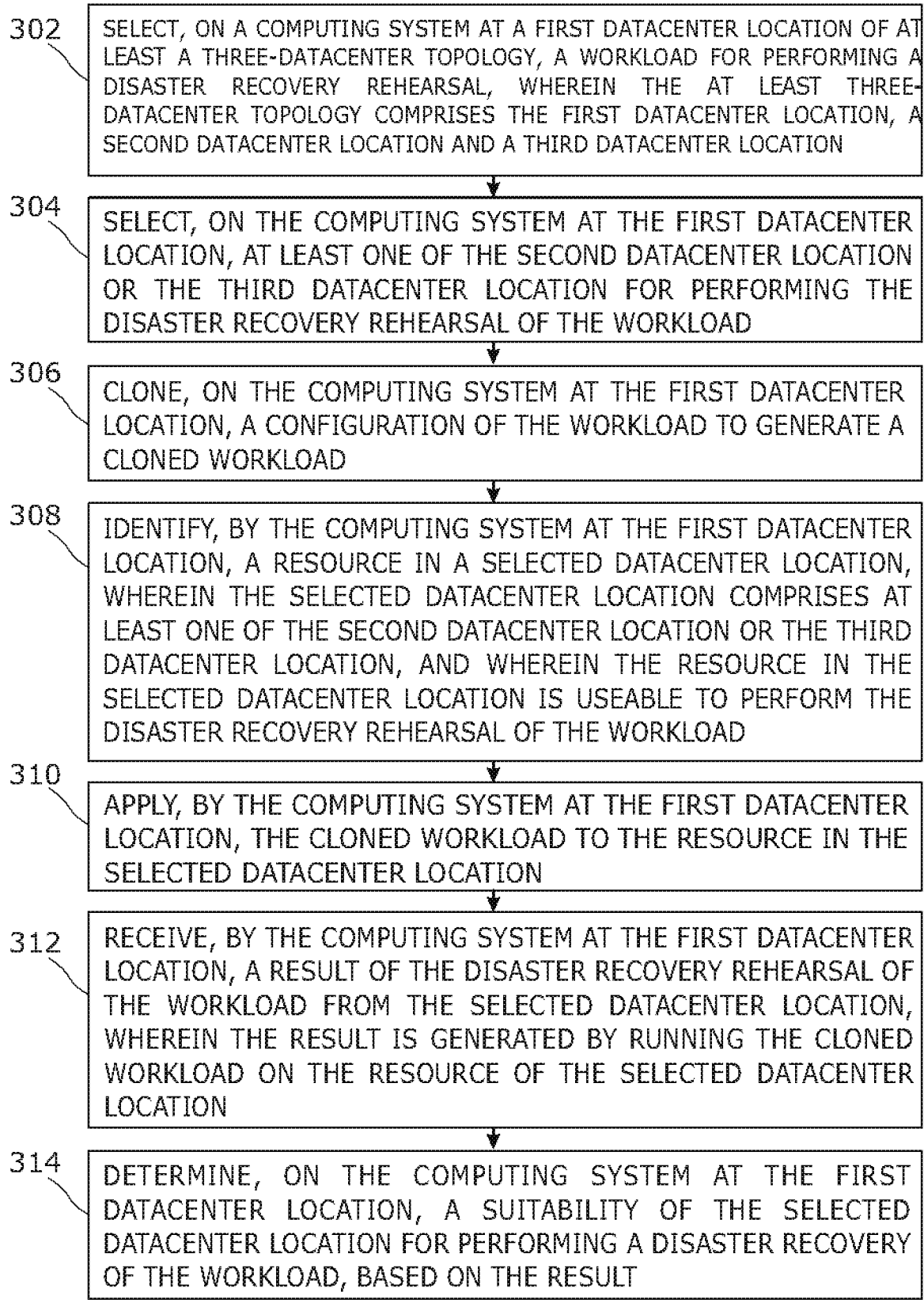
FIG. 3 is a block diagram of an example method of performing a disaster recovery rehearsal of a workload in at least a three-datacenter topology.

FIG. 3 is a block diagram of an example method 300 of performing a disaster recovery rehearsal of a workload in at least a three-datacenter topology. The method 300, which is described below, may be partially executed on a system such as computing system 110, 112, or 114 of FIG. 1, or system 200 of FIG. 2. However, other suitable computing devices may execute method 300 as well. At block 302, on a computing system at a first datacenter location of a three-datacenter topology, a workload may be selected for performing a disaster recovery rehearsal. The three-datacenter topology may comprise the first datacenter location, a second datacenter location and a third datacenter location. At block 304, on the computing system at the first datacenter location, at least one of the second datacenter location or the third datacenter location may be selected for performing the disaster recovery rehearsal of the workload. At block 306, on the computing system at the first datacenter location, a configuration of the workload may be cloned to generate a cloned workload.

At block 308, the computing system at the first datacenter location may identify a resource in a selected datacenter location, wherein the selected datacenter location may comprise at least one of the second datacenter location or the third datacenter location. The resource in the selected datacenter location may be useable to perform the disaster recovery rehearsal of the workload. At block 310, the computing system at the first datacenter location may apply the cloned workload to the resource in the selected datacenter location.

At block 312, the computing system at the first datacenter location may receive a result of the disaster recovery rehearsal of the workload from the selected datacenter location. The result may be generated by running the cloned workload on the resource of the selected datacenter location. At block 314, the computing system at the first datacenter location may determine a suitability of the selected datacenter location for performing a disaster recovery of the workload, based on the result.

Figure 4:
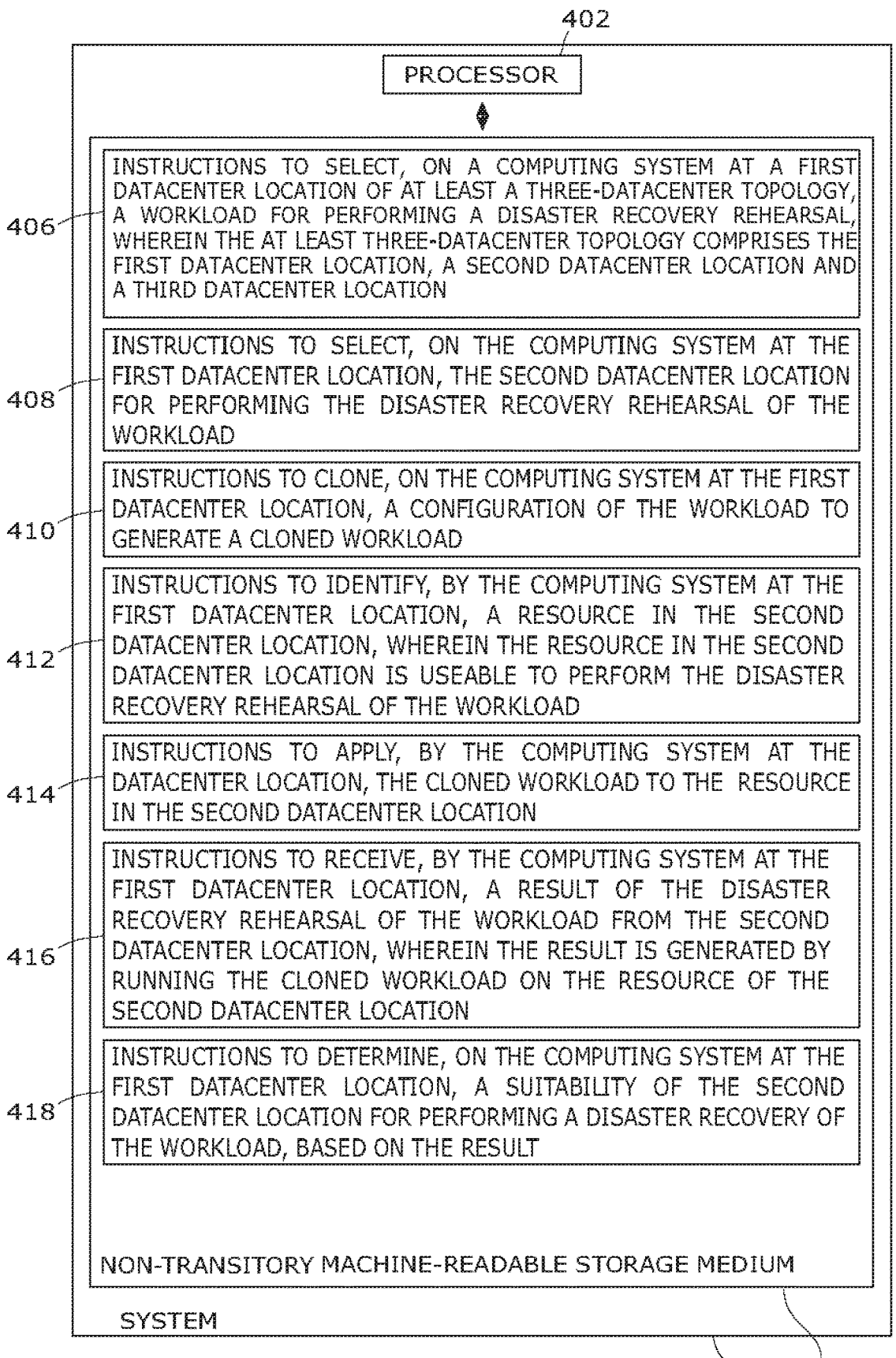
FIG. 4 is a block diagram of an example system including instructions in a machine-readable storage medium for performing a disaster recovery rehearsal of a workload in at least a three-datacenter topology.

FIG. 4 is a block diagram of an example system 400 including instructions in a machine-readable storage medium for performing a disaster recovery rehearsal of a workload in at least a three-datacenter topology. System 400 includes a processor 402 and a machine-readable storage medium 404 communicatively coupled through a system bus. In an example, system 400 may be analogous to computing system 110, 112, or 114 of FIG. 1, or computing system 200 of FIG. 2. Processor 402 may be any type of Central Processing Unit (CPU), microprocessor, or processing logic that interprets and executes machine-readable instructions stored in machine-readable storage medium 404. Machine-readable storage medium 404 may be a random access memory (RAM) or another type of dynamic storage device that may store information and machine-readable instructions that may be executed by processor 402. For example, machine-readable storage medium 404 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium may be a non-transitory machine-readable medium.

Machine-readable storage medium 404 may store instructions 406, 408, 410, 412, 414, 416, and 418. In an example, instructions 406 may be executed by processor 402 to select, on a computing system at a first datacenter location of a three-datacenter topology, a workload for performing a disaster recovery rehearsal. The three-datacenter topology may comprise the first datacenter location, a second datacenter location and a third datacenter location. Instructions 408 may be executed by processor 402 to select, on the computing system at the first datacenter location, the second datacenter location for performing the disaster recovery rehearsal of the workload.

Instructions 410 may be executed by processor 402 to clone, on the computing system at the first datacenter location, a configuration of the workload to generate a cloned workload. Instructions 412 may be executed by processor 402 to identify, by the computing system at the first datacenter location, a resource in the second datacenter location. The resource in the second datacenter location may be used to perform the disaster recovery rehearsal of the workload.

Instructions 414 may be executed by processor 402 to apply, by the computing system at the first datacenter location, the cloned workload to the resource in the second datacenter location. Instructions 416 may be executed by processor 402 to receive, by the computing system at the first datacenter location, a result of the disaster recovery rehearsal of the workload from the second datacenter location. The result may be generated by running the cloned workload on the resource of the second datacenter location.

Instructions 418 may be executed by processor 402 to determine, on the computing system at the first datacenter location, a suitability of the second datacenter location for performing a disaster recovery of the workload, based on the result.

For the purpose of simplicity of explanation, the example method of FIG. 3 is shown as executing serially, however it is to be understood and appreciated that the present and other examples are not limited by the illustrated order. The example systems of FIGS. 1, 2, and 4, and method of FIG. 3 may be implemented in the form of a computer program product including computer-executable instructions, such as program code, which may be run on any suitable computing device in conjunction with a suitable operating system (for example, Microsoft Windows, Linux, UNIX, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be noted that the above-described examples of the present solution is for the purpose of illustration only. Although the solution has been described in conjunction with a specific example thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The invention claimed is:

1. A method comprising:
   selecting, on a computing system at a first datacenter location of at least a three-datacenter topology, a workload for performing a disaster recovery rehearsal, wherein the at least three-datacenter topology comprises the first datacenter location, a second datacenter location and a third datacenter location;
   selecting, on the computing system at the first datacenter location, at least one of the second datacenter location or the third datacenter location for performing the disaster recovery rehearsal of the workload;
   cloning, on the computing system at the first datacenter location, a configuration of the workload to generate a cloned workload;
   identifying, by the computing system at the first datacenter location, a resource in a selected datacenter location, wherein the selected datacenter location comprises at least one of the second datacenter location or the third datacenter location, and wherein the resource in the selected datacenter location is useable to perform the disaster recovery rehearsal of the workload;
   applying, by the computing system at the first datacenter location, the cloned workload to the resource in the selected datacenter location;
   receiving, by the computing system at the first datacenter location, a result of the disaster recovery rehearsal of the workload from the selected datacenter location, wherein the result is generated by running the cloned workload on the resource of the selected datacenter location; and
   determining, on the computing system at the first datacenter location, a suitability of the selected datacenter location for performing a disaster recovery of the workload, based on the result.

2. The method of claim 1, wherein the applying comprises:
   generating, by the computing system at the first datacenter location, replicated data in the selected datacenter location, wherein the replicated data includes a replication of data at the first datacenter location;
   exposing, by the computing system at the first datacenter location, the replicated data to the resource; and
   masking, by the computing system at the first datacenter location, the replicated data in the selected datacenter location to make the replicated data in the selected datacenter location inaccessible to the resource.

3. The method of claim 1, wherein the identifying comprises:
   determining, by the computing system at the first datacenter location, whether the workload has a dependency on another resource;
   determining, by the computing system at the first datacenter location, whether another resource is available in the selected datacenter location; and
   determining, by the computing system at the first datacenter location, whether the another resource has a capacity to host the workload.

4. The method of claim 1, wherein the applying comprises disabling non-critical workloads on the selected datacenter location.

5. The method of claim 1, wherein the first datacenter location is in a same region as the second datacenter location.

6. The method of claim 1, wherein the first datacenter location and the second datacenter location are in a first region, and the third datacenter location is in a second region.

7. The method of claim 1, wherein the disaster recovery rehearsal includes validating at least one of a compute resource, a storage resource, a network resource, or an application resource in relation to the workload.

8. The method of claim 1, wherein the workload for performing the disaster recovery rehearsal includes a workload running in the first datacenter location.

9. The method of claim 1, wherein the applying of the cloned workload causes performance of the disaster recovery rehearsal at the selected datacenter location, the disaster recovery rehearsal comprising rehearsing actions at the selected datacenter location responsive to a disaster, and wherein the result is generated based on rehearsing the actions responsive to the disaster performed as part of the running of the cloned workload on the resource of the selected datacenter location.

10. The method of claim 1, wherein the cloning of the configuration of the workload comprises cloning an Internet Protocol (IP) address related to the workload, and cloning a storage logical unit number (LUN) related to the workload.

11. A computing system for a first datacenter location of at least a three-datacenter topology comprising the first datacenter location, a second datacenter location and a third datacenter location, the computing system comprising:
   a processor; and
   a non-transitory storage medium storing instructions executable on the processor to:
      select a workload for performing a disaster recovery rehearsal;
      select a selected datacenter location comprising at least one of the second datacenter location or the third datacenter location for performing the disaster recovery rehearsal of the workload;
      clone a configuration of the workload to generate a cloned workload;
      identify a resource in the selected datacenter location, wherein the resource in the selected datacenter location is useable to perform the disaster recovery rehearsal of the workload;
      apply the cloned workload to the resource in the selected datacenter location to perform the disaster recovery rehearsal at the selected datacenter location, the disaster recovery rehearsal comprising rehearsing actions at the selected datacenter location responsive to a disaster;
      receive a result of the disaster recovery rehearsal of the workload from the selected datacenter location, wherein the result is based on running the cloned workload on the resource of the selected datacenter location that rehearses the actions responsive to the disaster; and
      determine a suitability of the selected datacenter location for performing a disaster recovery of the workload, based on the result.

12. The computing system of claim 11, wherein the second or third datacenter location includes synchronously or asynchronously replicated data from the first datacenter location.

13. The computing system of claim 11, wherein the workload for performing the disaster recovery rehearsal includes a workload of a system in the first datacenter location.

14. The computing system of claim 11, wherein at least one of the first datacenter, the second datacenter location, or the third datacenter location is part of a private cloud system.

15. The computing system of claim 11, wherein the cloning of the configuration of the workload comprises cloning an Internet Protocol (IP) address related to the workload, and cloning a storage logical unit number (LUN) related to the workload.

16. A non-transitory machine-readable storage medium comprising instructions that upon execution cause a computing system at a first datacenter location to:
    select a workload for performing a disaster recovery rehearsal;
    select a second datacenter location for performing the disaster recovery rehearsal of the workload, the second datacenter location being part of at least a three-datacenter topology that includes the first datacenter location, the second datacenter location, and a third datacenter location;
    clone a configuration of the workload to generate a cloned workload;
    identify a resource in the second datacenter location, wherein the resource in the second datacenter location is useable to perform the disaster recovery rehearsal of the workload;
    apply the cloned workload to the resource in the second datacenter location to perform the disaster recovery rehearsal at the second datacenter location, the disaster recovery rehearsal comprising rehearsing actions at the second datacenter location responsive to a disaster;
    receive a result of the disaster recovery rehearsal of the workload from the second datacenter location, wherein the result is based on running the cloned workload on the resource of the second datacenter location that rehearses the actions responsive to the disaster; and
    determine a suitability of the second datacenter location for performing a disaster recovery of the workload, based on the result.

17. The non-transitory machine-readable storage medium of claim 16, wherein the instructions to apply the cloned workload include instructions to:
    generate, by the computing system at the first datacenter location, replicated data in the second datacenter location, wherein the replicated data includes a replication of data on the first datacenter location;
    expose, by the computing system at the first datacenter location, the replicated data to the resource; and
    mask, by the computing system at the first datacenter location, the replicated data in the second datacenter location to make logical unit numbers (LUNs) related to the replicated data inaccessible to the resource.

18. The non-transitory machine-readable storage medium of claim 16, wherein the instructions to apply the cloud workload include instructions to:
    generate, by the computing system at the first datacenter location, replicated data in the third datacenter location, wherein the replicated data includes a replication of data on the first datacenter location;
    expose, by the computing system at the first datacenter location, the replicated data in the third datacenter location to the resource of the second datacenter location; and
    mask, by the computing system at the first datacenter location, the replicated data in the second datacenter location to make logical unit numbers (LUNs) related to the replicated data inaccessible to the resource.

19. The non-transitory machine-readable storage medium of claim 16, wherein at least one of the first datacenter location, the second datacenter location or the third datacenter location, includes one of a public cloud system, a private cloud system, and a datacenter.

20. The non-transitory machine-readable storage medium of claim 16, wherein the cloning of the configuration of the workload comprises cloning an Internet Protocol (IP) address related to the workload, and cloning a storage logical unit number (LUN) related to the workload.

* * * * *